May 4, 1943.    E. F. GRETHER    2,317,990
PROCESS OF TREATING A HUMOUS MATERIAL AND RESULTING PRODUCT
Filed May 10, 1939
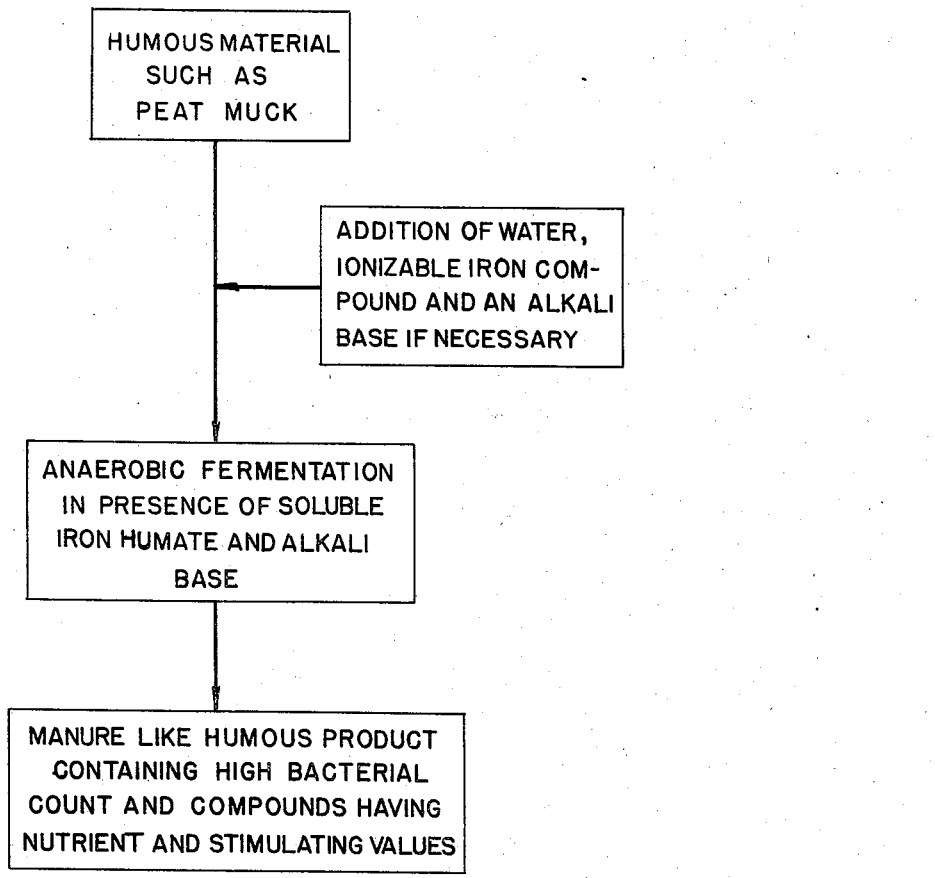
Inventor
ERNEST F. GRETHER
By Semmes, Keegin & Semmes
Attorneys Patented May 4, 1943

2,317,990

UNITED STATES PATENT OFFICE

2,317,990

PROCESS OF TREATING HUMOUS MATERIAL AND RESULTING PRODUCTS

Ernest F. Grether, Midland, Mich., assignor to The Dow Chemical Company, Midland, Mich., a corporation of Michigan Application May 10, 1939, Serial No. 272,896

5 Claims. (Cl. 71—10)

My invention relates to a humous material, and more particularly to a method of producing a plant stimulant and an increase in bacteria within a humous material having manure-like properties. This application is a continuation-in-part of my co-pending applications Serial No. 118,637, filed December 31, 1936 and Serial No. 151,018, filed June 29, 1937.

It is well known that humous material, such as composted cellulosic material and naturally occurring humous material, such as muck, is beneficial when applied to certain types of soil. This is due principally to the fact that the moisture absorbent properties of the humous material enable the soil to maintain its moisture, thereby providing soil conditions in which bacteria beneficial to plant growth may multiply. After being applied to the soil, the humous material also undergoes a slow decomposition which makes available to the growing plant some of its insoluble, nitrogenous, proteinic and other compounds which have nutritive values. This decomposition is hastened if the soil is alkaline due to the presence of lime.

Hitherto, many attempts have been made to devise methods of treating these humous materials to convert the nutritive compounds which they contain into a plant available form before the humous material is applied to the soil. In the autoclave process, for instance, the humous material is super-heated to cause the conversion of some of these compounds. Other methods have been devised in which the material is subjected to a fermentation which is usually of the aerobic or semi-aerobic type. For example, a customary method is to neutralize muck with lime and subject the mixture to an aerobic or semi-aerobic fermentation. Various compounds are sometimes added before fermentation usually to supply deficiencies in the plant available contents of the humous material and to produce a balanced fertilizer.

Although the desirability of producing a humous material having plant stimulating and fertilizing values is apparent, none of the above described methods have met with any degree of commercial success, and it is therefore probable that these efforts to make available the plant nutrients contained in humous material have been wholly or partly unsuccessful. Moreover, none of the prior methods produce an end product having the manure-like properties and bacterial count associated with the end product of applicant's process.

One of the objects of my invention is to provide a process by which the bacterial count of the humous material may be greatly increased.

Another object of my invention is to provide a process by which plant stimulants are produced within a humous material.

Still another object of my invention is to provide a process for anaerobically fermenting a humous material in the presence of soluble iron humate and an alkali base.

Yet another object of my invention is to provide a process which will produce a humous material having the characteristics and containing many of the compounds present in manure.

Still another object of my invention is to provide a plant stimulant and fertilizer having manure-like characteristics, a high bacterial count, and having plant stimulating values over and above the effect that would normally be produced from the plant food present.

A further object of my invention is to provide a humous material which is a plant stimulant and a balanced fertilizer.

With these and other objects in view, my invention embraces broadly the concept of subjecting a humous material to an anaerobic fermentation in the presence of an iron compound and an alkali base or a mixture of alkali bases. A sufficient quantity of alkali base is added to produce a pH value of at least 7, and in the preferred form of my invention the hydrogen ion concentration of the mixture is controlled by the addition, if necessary, of additional quantities of the alkali base during fermentation. However, normally after the pH is adjusted, the hydrogen ion concentration stays within the desired range. The desired anaerobic fermentation may be secured by the addition of sufficient water to form a paste-like mass, or by any other suitable procedure which will exclude the atmosphere.

The starting material for my process is a humous material, that is, a substance that has undergone a previous fermentation, such as peat muck, lignite, leaf mold, or composed cellulosic material such as decayed straw, as distinguished from raw cellulosic materials, such as corn stalks. While my process may be adapted for use with any of the above mentioned types of humous material, for purposes of illustration I will disclose the process as adapted to the use of peat muck as a starting material, and the use of water to promote the anaerobic fermentation.

Muck is a naturally occurring humous material which has undergone a previous fermentation and is usually acidic in character. However, either an acidic, neutral or alkaline muck may be used as a starting material in my process unless the alkalinity of the substance is due to the presence of compounds containing calcium, such as limestone or the alkali earth metals.

Muck ordinarily contains a great variety of bacteria which are more or less related to regular soil bacteria. A large proportion of the action of converting cellulosic material into muck by naturally occurring processes was performed by aerobic facultative bacteria. While the type of bacteria flora changes with increased acidity, none of the types of bacteria normally present are in a position to act upon the proteinic content of the muck.

When any of the humous materials, such as muck, are treated in the manner disclosed in this application, the change in physical form, hydrogen ion concentration, and the presence of soluble iron humate create optimum conditions for the development of anaerobic bacteria. During the process, the desired bacteria develop more rapidly due to the favorable conditions, and the aerobic bacteria and some of the facultative bacteria are paralyzed or consumed. Thus, although the humous material which is used as a starting material may contain a large bacterial count, the end product of my process is marked by an immense increase in total bacteria combined with a marked decrease in the variety of bacteria which are present.

By means of the anaerobic bacterial types, the growth of which is stimulated by the presence of the soluble iron, proteinic ingredients are attacked and used for bacterial food which is converted into other substances. Tests have shown positively that the end products created by the bacteria favored by my process contain ingredients which stimulate the growth of plants.

The single sheet of drawings discloses a flow sheet illustrative of one form of my invention.

In the illustrated method, a naturally occurring humous material, such as muck, is used as the starting material. In carrying out my invention, a quantity of water, unless the selected material already contains sufficient water to be in the form of a paste, and, if necessary, an ionizable iron compound and an alkali base or a mixture of alkali bases are added to the selected humous material.

Preferably, I add the ionizable iron compound before the alkali base, although this order may be reversed if desired. If either the iron compound or alkali base is present in the starting material in sufficient quantities for the purposes of this process, additional amounts need not be added. The ionizable iron compound and base are preferably added in the form of aqueous solutions.

The quantity of water added varies with the moisture content of the original starting material and the amount of water added in the ionizable iron compound and the alkali base solutions. However, the resulting mixture, when these substances have been added, should have a sufficient moisture content to form a liquid paste-like mass. I have found that normally, in order to obtain this liquid paste-like form, the moisture content must be at least seventy percent by weight of the dry content of the original humous starting material.

Among the various iron compounds which can be used may be mentioned ferric or ferrous hydroxide, ferric or ferrous sulphate, ferric chloride, ferrous ammonium sulphate, or a mixture of these or similar compounds, such as iron acetate or citrate. The proportion of iron compound employed varies widely with the quantity of iron present in the original starting material and in the type of material selected. Some muck contains a quantity of insoluble iron humate, and if sufficient of this or any other iron compound is present, no additional iron is necessary. However, in practice, when an average type muck is employed, the quantity of iron necessary to add varies between 0.05 and 0.5 gram molecule of iron per kilogram of dry humous material. In order to enable the iron to be thoroughly mixed with the humous material, it is preferably added in the form of an aqueous solution. The concentration of solution used depends upon the physical condition of the starting material to which it is added.

After the iron compound has been added, a sufficient quantity of an alkali base, such as the hydroxides or carbonates of potassium, sodium, or ammonia, or a mixture of these bases, is added to the humous material to cause a pH value in the resulting mixture of from 7 to 10, and preferably between 8 and 9. The proper regulation of this pH value is important as it results in a more complete conversion of the starting material, and the use of pH values outside the range specified is impractical. After the addition of the alkali, the mixture is warmed with stirring for half an hour if insoluble iron humate is present in sufficient quantities to be utilized in the starting material.

Of course, if a sufficient quantity of these alkali bases is already present in the material, it will be unnecessary to add an additional amount. The alkali base, if necessary, is preferably added in the form of an aqueous solution so that it may be readily mixed with the humous material.

The addition of the alkali base to the humous material causes the iron compound to be dissolved with the formation of a soluble humate iron within the mass. This novel reaction requires less alkali than the known method for preparing iron humate which comprises first preparing or separating the humic acid in purified condition, dissolving the acid in an aqueous alkali, and then adding a soluble iron salt, thereby causing the formation of iron humate and an inorganic salt by a double decomposition reaction. Moreover, by my method the iron humate is prepared without the simultaneous formation of a difficultly separable inorganic salt, such as is obtained in the double decomposition reaction. If an insoluble iron humate was present in the original starting material, the addition of the alkali converts this material into a soluble form.

The applicant has found that iron humate in humous material is soluble and stabilized only when an alkali is present. Moreover, the alkali apparently releases some of the compounds, such as protein, which are present in the humous material, thus making them available for bacterial food and thereby initiating a fermentation.

The alkali employed also reacts to form salts which are retained in the fertilizer product but which do not interfere with the iron humate. For this reason an alkali, such as the compounds of ammonia or potassium, which add food value to the product, is preferably employed, although the compounds of sodium may be employed if desired. The alkali earth metal hydroxides, particularly lime, cannot satisfactorily be used since they render humate iron insoluble and unavailable to plants.

The applicant has found that the presence of a sufficient quantity of iron humate and an alkali base are absolutely necessary in practicing his process. The presence of these compounds in soluble form is the determining factor in producing, during the anaerobic fermentation, the large increase in bacteria and the resulting manure-like end product containing plant stimulants.

After a sufficient quantity of an alkali base has been added to the humous material to form the soluble iron humate and to produce a reduced hydrogen ion concentration of from 7 to 10, the resulting mixture is subjected to an anaerobic fermentation of from a few days to three months duration at room temperature or at a temperature which is regulated at any desired point at a range between 15 and 30° C. In this connection the applicant has found that, if temperatures above 40° C. are employed, the desired increase in bacterial growth of the type desired cannot be obtained.

By the term "anaerobic fermentation" in this application is meant a fermentation which is truly anaerobic as distinguished from the aerobic-anaerobic fermentations usually disclosed in the prior art. The most convenient way of producing true anaerobic conditions is to reduce the humous material to a paste-like mass which will practically exclude the penetration of the atmosphere into the interior of the mixture during fermentation.

These conditions were sometimes present during the original fermentation of the cellulosic materials which form the humous material known as muck, although even muck situated on lake bottoms may decay under more or less aerobic conditions since air can penetrate into water, while the penetration of the liquid paste-like form of the material in my process is much more limited due to the consistency of the material. This type of fermentation is entirely different from a fermentation of a humous material having a lower moisture content.

The applicant has not been able to ascertain the exact type of bacteria which is developed in his process, although it is apparently not of a nitrifying type. The humous material is self-inoculated by bacteria in the air, which is believed to be a soil type of bacteria. Of course, many types of bacteria are present at first, but the condition of the humous material produced by the process is such that the desired type or types of bacteria multiply at the expense of those not desirable, and therefore the desired end product is obtained.

During the fermentation, the bacteria increases enormously. In some cases, for instance, the applicant has observed an increase approximately forty-fold during the fermentation, the fermented product containing about 600,000,000 per gram of the dry humous starting material employed in making the same. This large increase in bacterial count is due to the presence of the soluble iron humate, the particular type of fermentation, and the conditions under which it is employed. In addition to having a beneficial effect upon growing plants, the increased bacterial count and the presence of the soluble iron humate during the anaerobic fermentation results in an end product having a distinct manure-like odor.

In this connection, the applicant has found that, while the bacterial count reaches a peak during the first week of the fermentation, the manure-like odor is usually more pronounced after a fermentation of three weeks. Moreover, the material is at least as active if the fermentation is continued for from two to three months.

The bacterial action breaks up the organic material, especially the nitrogenous materials, and converts them into products of a nature similar to that produced by intestinal digestion and the following manure fermentation. The manure-like odor is characteristic of the fermentation and is entirely unlike the putrefactive odor usually associated with the fermentation of organic materials and proteins. On the contrary, it resembles the odor of manure, especially stored liquid manure.

This odor is a result of the presence of the ammonium sulphide and indole derivatives, just as in manure. The odor suggests that the fermentation causes a reaction in which the cystine radical is split from the molecule of the proteinic material which forms a part of the contents of the humous material. When this reaction on one part of the protein molecule occurs, it is believed that other parts of the molecule are broken up into compounds, such as amines, amino acids and amino alcohols. The bacteria may use these compounds in part for food and convert other ingredients into other forms.

This bacterial action in the presence of soluble iron humate produces the stimulant content of the processed material. That such stimulants are present is indicated by the effect of the end product of the process described above on growing plants, which is very similar to that of the effect of rotted manure. This end product is a fertilizer because it contains plant food constituents, but it also contains a plant stimulant because its growing action on plants is in excess of this food content. The bacteria contained in this humous material is believed to be partly responsible for this plant stimulating action, because its presence renders soil minerals more available, but it is also believed that the stimulation products, which are released from the nitrogenous, proteinic, or other material through their action, increases the appetite of the plant. This action results in a larger consumption of mineral elements and carbon dioxide by the plants.

When the processed material is subjected to heat for some time and cooled and then extracted with ether, the ether extract contains methyl butyric acid. Methyl butyric acid is also obtained when auxin is decomposed. Auxin, hetero-auxin, and skatole can be obtained from manure, and therefore our materials must contain these ingredients or similar ones which have a stimulating action on plants.

The product produced by the fermentation is a dark brown paste which may be stored or applied directly to the soil. It is dense, heavy, and imporous, as distinguished from the light, fluffy starting material which regains its original form upon drying even when soaked in water.

If desired, this end mixture may be mixed with a filler as disclosed in my co-epnding application, Serial No. 204,475, filed April 26, 1938. Preferably, this filler is a dried portion of some of the humous material which is employed as a starting material in the process. However, if desired, a material, such as dried peat, bran, or other cellulosic material having water absorption powers, may be used.

The following specific examples are given to illustrate the method of applying the above disclosed process, and are not to be construed as limiting the invention, as the particular quantities of the substances used and the length of fermentation depend upon the conditions present and the type of material which is selected as a starting material for the process:

Example I 1200 grams of peat was treated with a solution of 130 grams of potassium hydroxide in 3480 cubic centimeters of water, after which 80 grams of anhydrous ferric sulphate was added with stirring. The resultant mixture was a paste-like mass comprising humate iron and potassium salts as well as nitrogen compounds initially present in the peat. It was neutralized with 15 cubic centimeters of 1 normal aqueous potassium hydroxide solution after which it was fermented by standing in moist condition at temperatures between 30° and 35° C. After standing under said condition for three days, the product had developed a manure-like odor which became more intense on longer standing. The fermented product was highly effective as a fertilizer and plant stimulant.

Example II 1200 grams muck with a 50% dry content, 30 g. caustic potash, and 12 g. ferrous sulfate are thoroughly mixed; and then the pH is adjusted to 8.6 by addition of 1 N caustic potash. If necessary, sufficient water is added to give the mixture a moisture content of 70% by weight of the original dry content of the starting material. The product is set aside for fermentation for three weeks.

While for purposes of illustration I have described my process as adapted to the treatment of a naturally occurring humous material, such as muck, it is apparent that this process may be used in connection with any humous material. The material may be acidic, neutral, or alkaline in character, as previously mentioned, but cannot contain an appreciable amount of earth metal hydroxides or other compounds containing the calcium ion.

None of the substances mentioned need be added to my process if they are already present in sufficient quantities in the original humous starting material, and all of the water may be added in the form of a solution containing the iron compound or the alkali base or both, the sole limitation in the process being that the anaerobic fermentation be conducted in the presence of sufficient quantities of soluble iron humate and an alkali base or mixture of bases. The term "anaerobic fermentation" in this application is limited to a fermentation which is conducted with a practically total exclusion of air, in the manner previously described.

Although I have only described one method of practicing my invention, it is believed obvious that the concept is of a much broader scope, and I therefore intend that this application be only limited by the prior art and the scope of the appended claims.

I claim:

1. A process of producing a plant stimulant, plant nutrients, and an increased bacterial count within a humous material comprising subjecting a humous material, having a moisture content of at least 70 percent by weight of the dry content of the original starting material, to fermentation under substantially anaerobic conditions in the presence of an added quantity of a soluble iron compound and a sufficient quantity of an alkali base to cause the mixture to have a pH value of at least 7.

2. A process of producing a plant stimulant, plant nutrients, and an increased bacterial count within a humous material comprising subjecting a humous material, having a moisture content of at least 70 percent by weight of the dry content of the original starting material, to fermentation under substantially anaerobic conditions of at least several days' duration in the presence of an added quantity of a soluble iron compound and a sufficient quantity of an alkali base to cause the mixture to have a pH value of at least 7.

3. A process of producing a plant stimulant, plant nutrients, and an increased bacterial count within a humous material comprising the steps of adding a sufficient amount of an ionizable iron compound, an alkali base, and water to a humous material to obtain a paste-like mixture having a moisture content of at least 70 percent by weight of the dry content of the original starting material and a pH value between 7 and 10, and then subjecting the resulting mixture to fermentation under substantially anaerobic conditions for a period of at least several days duration at a temperature between 20–40° C.

4. A process of producing a plant stimulant, plant nutrients, and an increased bacterial count within a humous material comprising the steps of adding a sufficient quantity of water, an aqueous solution of an ionizable iron compound, and an aqueous solution of an alkali base to the humous material to obtain a paste-like mixture having a pH value of at least 7 and having a moisture content of at least 70 percent by weight of the original starting material, and then subjecting the resulting mixture to fermentation under substantially anaerobic conditions.

5. A process of producing a plant stimulant, plant nutrients, and an increased bacterial count within a humous material comprising the steps of adding a sufficient quantity of water, an aqueous solution of an ionizable iron compound, and an aqueous solution of an alkali base to the humous material to obtain a paste-like mixture having a moisture content of at least 70 percent by weight of the dry content of the original starting material and a pH value between 8 and 9, and then subjecting the resulting mixture to an anaerobic fermentation of at least several days' duration at a temperature between 20–30° C.

ERNEST F. GRETHER.